(12) United States Patent
Anda et al.

(10) Patent No.: US 7,370,736 B2
(45) Date of Patent: May 13, 2008

(54) LAMINATED SHIM FOR DISC BRAKE AND PAD UNIT HAVING THE LAMINATED SHIM

(75) Inventors: Hiroshi Anda, Nagoya (JP); Nobuyuki Oi, Nagoya (JP)

(73) Assignee: Advics Co., Ltd., Kariya, Aichi-Ken (JP)

( * ) Notice: Subject to any disclaimer, the term of this patent is extended or adjusted under 35 U.S.C. 154(b) by 299 days.

(21) Appl. No.: 11/197,342

(22) Filed: Aug. 5, 2005

(65) Prior Publication Data

US 2006/0027427 A1    Feb. 9, 2006

(30) Foreign Application Priority Data

Aug. 6, 2004    (JP) .............................. 2004-230373

(51) Int. Cl.
F16D 65/38    (2006.01)
F16D 69/00    (2006.01)

(52) U.S. Cl. .............................. 188/73.36; 188/73.37; 188/250 E

(58) Field of Classification Search ............. 188/73.35, 188/73.36, 73.37, 73.1, 250 B, 250 E, 250 G; D12/180
See application file for complete search history.

(56) References Cited

U.S. PATENT DOCUMENTS 5,320,200 A * 6/1994 Hashimoto .............. 188/250 E
5,467,846 A * 11/1995 Abe et al. ................ 188/73.37
5,975,252 A * 11/1999 Suzuki et al. .............. 188/73.1
2006/0157307 A1* 7/2006 Tsurumi et al. ......... 188/250 G

FOREIGN PATENT DOCUMENTS

| JP | 10-318301 | | 12/1998 |
| JP | 11-101280 | | 4/1999 |
| JP | 2006183808 A | * | 7/2006 |

* cited by examiner

Primary Examiner—Thomas Williams
(74) Attorney, Agent, or Firm—Buchanan Ingersoll & Rooney PC

(57) ABSTRACT

A laminated shim for a disc brake has a pad side shim and a pressing member side shim. The pad side shim is provided at a backside of a backing plate of pad. The pressing member side shim is disposed between the pad side shim and a pressing member used for pressing the pad against a rotor. The pad side shim has hooks that extend over and are hooked onto a peripheral edge of the backing plate. The pressing member side shim has hooks that extend over a surface of a respective pad side hook. The pressing member hooks are slidably contacted to the top of the hooks of the pad side shim so as to be easy to slide in a surface direction with respect to the pad side shim and the backing plate of the pad.

7 Claims, 4 Drawing Sheets

LAMINATED SHIM FOR DISC BRAKE AND PAD UNIT HAVING THE LAMINATED SHIM

This application claims priority to Japanese application serial number 2004-230373, the content of which is incorporated herein by reference.

BACKGROUND OF THE INVENTION

1. Field of the Invention

The present invention relates to a laminated shim for a disc brake that is disposed between a pad and a pressing member, for pressing a pad against a rotor. The present invention suppresses undesired brake sounds generated between the pressing member and the pad. In particular, the invention relates to a laminated shim for a disc brake having a pad side shim provided at a backside of the backing plate of a pad, and a pressing member side shim disposed between the pad side shim and the pressing member in a laminated manner.

2. Description of the Related Art

Conventionally, various laminated shims have been known, for example, laminated shims are known as described in Japanese Laid-Open Patent Publication No. 2002-318301 and No. 2003-101280.

Japanese Laid-Open Patent Publication No. 2002-318301 teaches a laminated shim that has a pad side shim provided on the backside of the backing plate of a pad, and a pressing member side shim disposed in a laminated manner between the pad side shim and the pressing member (i.e., a piston or caliper claw). The pad side shim has two outer edge pad hooks connected to the backing plate and two inner edge pad hooks. The outer edge pad hooks have a configuration where they extend over the outer peripheral edge of the backing plate extending along the rotor peripheral edge. The outer edge pad hooks are attached to the outer peripheral edge of the backing plate. On the other hand, the inner edge pad hooks have a configuration where they extend over an inner (with regard to the radial direction of the rotor) peripheral edge of the backing plate. The inner peripheral edge extends along an inner rotor circumference near the center of the rotor. The pressing member side shim has one outer edge pressing member hook attached to the backing plate and two inner edge pressing member hooks. The outer edge pressing member hook and the inner edge pressing member hooks of the pressing member side shim have a configuration where they extend over the outer peripheral edge of the backing plate at positions avoiding the outer edge pad hooks and the inner edge pad hooks of the pad side shim. The outer edge pressing member hook and the inner edge pressing member hooks and are attached directly to the peripheral edge of the backing plate.

Japanese Laid-Open Patent Publication No. 2003-101280 teaches a pad side shim that has one outer edge pad hook attached to the backing plate and two inner edge pad hooks. A pressing member side shim has one outer edge pressing member hook attached to the backing plate and two inner edge pressing member hooks. The outer edge pressing member hook and the inner edge pressing member hooks of the pressing member side shim have a configuration where they extend over the peripheral edge of the backing plate at positions avoiding the outer edge pad hooks and the inner edge pad hooks of the pad side shim. The outer edge pressing member hook and the inner edge pressing member hooks are directly attached to the peripheral edge of the backing plate.

Therefore, the pressing member side shims, according to No. 2002-318301 and No. 2003-101280, are configured to hook directly onto the peripheral edge of the backing plate via the outer edge pressing member hook and the inner edge pressing member hooks.

However, one of the objectives of the laminated shim is for the laminated shim to suppress undesired or disturbing sounds that may be made when the pressing member is displaced relative to the surface of the backing plate of the pad. Therefore, the laminated shim desirably has a configuration where the pressing member side shim slides relatively easily along the surface with respect to the pad side shim and the backing plate. However, the pressing member hooks of the pressing member side shims according to No. 2002-318301 and No. 2003-101280 were configured to hook directly onto the peripheral edge of the backing plate. Therefore, the pressing member hooks of the pressing member side shims are not prone to slide with respect to the backing plate due to the frictional resistance arising between the hook and the profile of the peripheral edge of the backing plate. As a result, the pressing member side shims do not easily slide along a surface direction with respect to the pad side shim and the backing plate, resulting in the generation of undesired brake noise.

SUMMARY OF THE INVENTION

The invention has a configuration where the pressing member side shim easily slides along a surface direction with respect to the pad side shim and the backing plate of the pad.

According to one aspect of the present teachings, a laminated shim for a disc brake has a pad side shim and a pressing member side shim. The pad side shim is provided at the backside of the backing plate of a pad. The pressing member side shim is disposed between the pad side shim and the pressing member, which presses the pad against a rotor. The pad side shim has one or more hooks that extend over a peripheral edge of the backing plate and are attached directly to the peripheral edge of the backing plate. The pressing member side shim has one or more hooks which extend over the external surfaces of the respective hooks of the pad side shim, which in turn contact the peripheral edge of the backing plate. Consequently, the pressing member side shim slidably contacts the external surfaces of the hooks of the pad side shim.

Therefore, the one or more hooks of the pressing member side shim contact the surfaces of the respective hooks of the pad side shim. The pressing member side shims are hooked to the backing plate via the external surfaces of the hooks of the pad side shims. The hooks of the pressing member side shim slidably contact the surfaces of the hooks of the pad side shim. The hooks of the pressing member side shim more easily slide along a surface direction with respect to the backing plate as compared with a conventional configuration where the hooks of the pressing member side shim are directly attached to the periphery of the backing plate. Since the hooks of the pad side shim may be formed from a metal plate, such as stainless steel plate, the hooks of the pad side shim may have a smaller frictional resistance as compared with the backing plate.

In this way, the pressing member side shim easily slides along a surface direction along with the pressing member (i.e., a piston or claws) with respect to the pad side shim and the backing plate. Therefore, the pressing member side shim can effectively suppress the undesired or disturbing sounds otherwise generated when the pressing member is displaced along a surface direction relative to the pad.

In another aspect of the present teachings, the pad side shim may have one or several outer edge pad hooks and one or several inner edge pad hooks. The outer edge pad hooks of the pad side shim extend over an outer peripheral edge of the backing plate, which in turn extends along an outer circumferential edge of the rotor. The outer edge pad hooks of the pad side shim are hooked onto the outer peripheral edge of the backing plate. The inner edge pad hooks of the pad side shim extend over an inner peripheral edge of the backing plate, which in turn extends along an inner circumference of the rotor near the center of the rotation. The inner edge pad hooks of the pad side shim are hooked onto the inner peripheral edge of the backing plate. The pressing member side shim has one or more outer edge pad hooks and one or more inner edge pad hooks. The inner edge pressing member hooks of the pressing member side shim extend over the inner peripheral edge of the backing plate. The outer edge pressing member hooks of the pressing member side shim extend over the outer peripheral edge of the backing plate. All of the one or more outer edge pressing member hooks of the outer pressing member side shim extend over an external surface of the respective outer edge pad hooks of the pad side shim. The outer edge pressing member hooks of the pressing member side shim are slidably attached to the external surfaces of the respective outer edge pad hooks of the pad side shim.

Consequently, all of the outer edge pressing member hooks formed on the outer edge of the pressing member side shim slidably contact the surface of the outer edge pad hooks of the pad side shim. Therefore, the entire outer edge of the pressing member side shim easily slides along the rotor circumferential direction with respect to the backing plate.

In another aspect of the present teachings, at least one of the hooks of the pressing member side shim is attached to the top surface of a hook of the pad side shim. The hook of the pressing member side shim may have a neck portion and a contact portion. The neck portion extends over the top (i.e., external) surface of the corresponding hook of the pad side shim. The contact portion is provided at one end of the neck portion and is slidably attached to the top surface of the hook of the pad side shim. The lateral size of the neck portion may be smaller than the lateral size of the contact portion.

Therefore, the neck portion is likely to be subjected to stress concentration and more apt to undergo elastic deformation, as compared with other portions, when the pressing member side shim is applied with a force along a surface direction. Therefore, the pressing member side shim can be easily displaced along a surface direction due in part to the elastic deformation of the neck portion.

Since the contact portion slidably contacts the top surface of the corresponding hook of the pad side shim, the contact portion can slide along a surface direction with respect to the pad side shim and the backing plate. In this way, the pressing member side shim can move along a surface direction with respect to the pad side shim and the backing plate due at least in part to the elastic deformation of the neck portion and the sliding of the contact portion.

In another aspect of the present teachings, the neck portion of the hook of the pressing member side shim extends in a curved manner above the top surface of the respective hook of the pad side shim. Therefore, since the neck portion extends in a curved manner, the neck portion has a relatively large length in an extending direction as compared to a case in which the neck portion is not extended in the curved manner. As a result, the elastic deformation of the neck portion may be increased. Subsequently, the moving distance of the pressing member side shim along a surface direction is increased with respect to the pad side shim and the backing plate.

In another aspect of the present teachings, a pad unit for a disc brake has a laminated shim for the disc brake and the pad. Several recesses are formed on the peripheral edge of the backing plate of the pad corresponding to the locations of the hooks of the pad side shim. The hooks of the pad side shim and the hooks of the pressing member side shim, which slidably contact the top surfaces of the hooks of the pad side shim, are internally arranged within the corresponding recesses. This configuration causes the sliding distances of the hooks of the pressing member side shims to be restricted by the faces or walls of the recess. Therefore, the hooks of the pressing member side shim slide along in the circumferential direction of the rotor on the top surfaces of the hooks of the pad side shim. The wall faces of the backing plate recesses restrict the sliding ability of the pressing member side shim hooks.

DETAILED DESCRIPTION OF THE INVENTION

Each of the additional features and teachings disclose above and below may be utilized separately or in conjunction with other features and teachings to provide improved laminated shim assemblies for disc brake and pad units having laminated shims. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
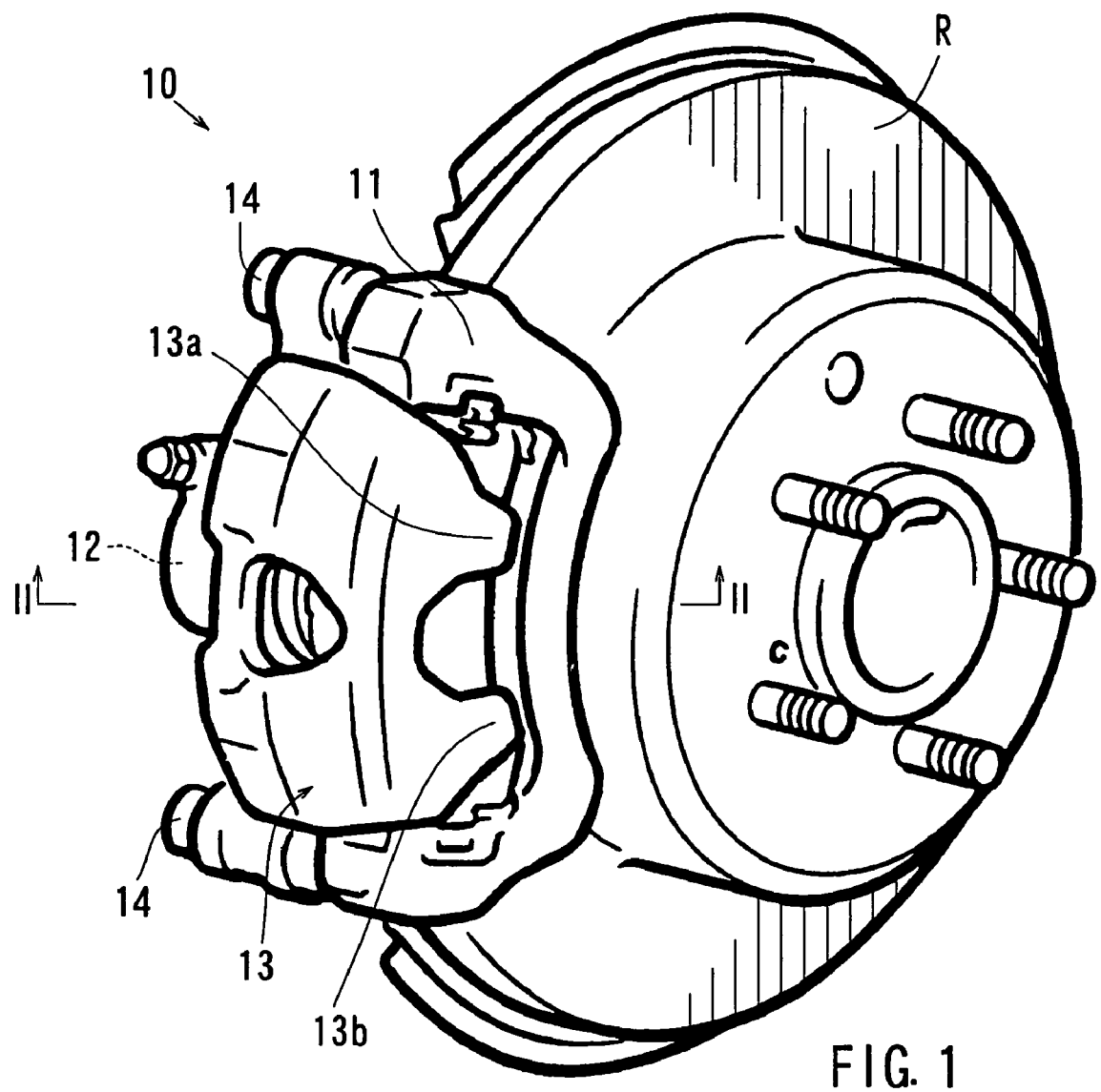
FIG. 1 is a perspective view of a disc brake.

An embodiment of the invention is described according to FIG. 1 to FIG. 6. A disc brake 10, which may be a floating disc brake as shown in FIG. 1, has a mounting 11 fixed to a vehicle body side, a caliper 13 movably supported by the mounting 11, and two pad units 1 shown in FIG. 2. Each of the pad units 1 includes a pad 3 and a laminated shim 2.

The mounting 11 supports the caliper 13 via two slide pins 14, as shown in FIG. 1. The caliper 13 straddles a rotor R across a rotor axis direction outside of the outer periphery of the rotor R, and moves in a rotor axis direction. A piston 12 is internally arranged on an inner side (i.e., a vehicle body side) of the caliper 13. Claws 13a and 13b, are formed on an outer side (i.e., outside of the vehicle body).

Figure 2:
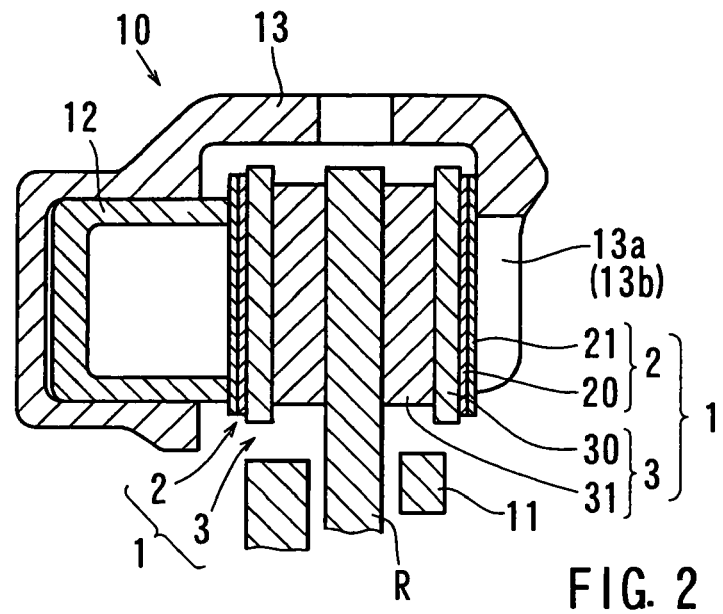
FIG. 2 is a sectional view along an arrowed line II-II of FIG. 1.

The piston 12 is configured to press the pad 3, provided at the inner side of the rotor R, against the rotor R as shown in FIG. 2. When the pad 3 at the inner side is pressed against the rotor R by the piston 12, the caliper 13 moves towards the inner side (i.e., to the left as viewed in FIG. 2) of the piston 12 due to the reaction force caused by the pressing action. The claws 13a (13b) of the caliper 13 consequently press the pad 3 located on the outer side of the rotor R. Therefore, each of the pads 3 is pressed against the rotor R due to the cooperation between the piston 12 and the claws 13a and 13b. The piston 12 and the claws 13a and 13b correspond to the pressing member described in claims.

Figure 4:
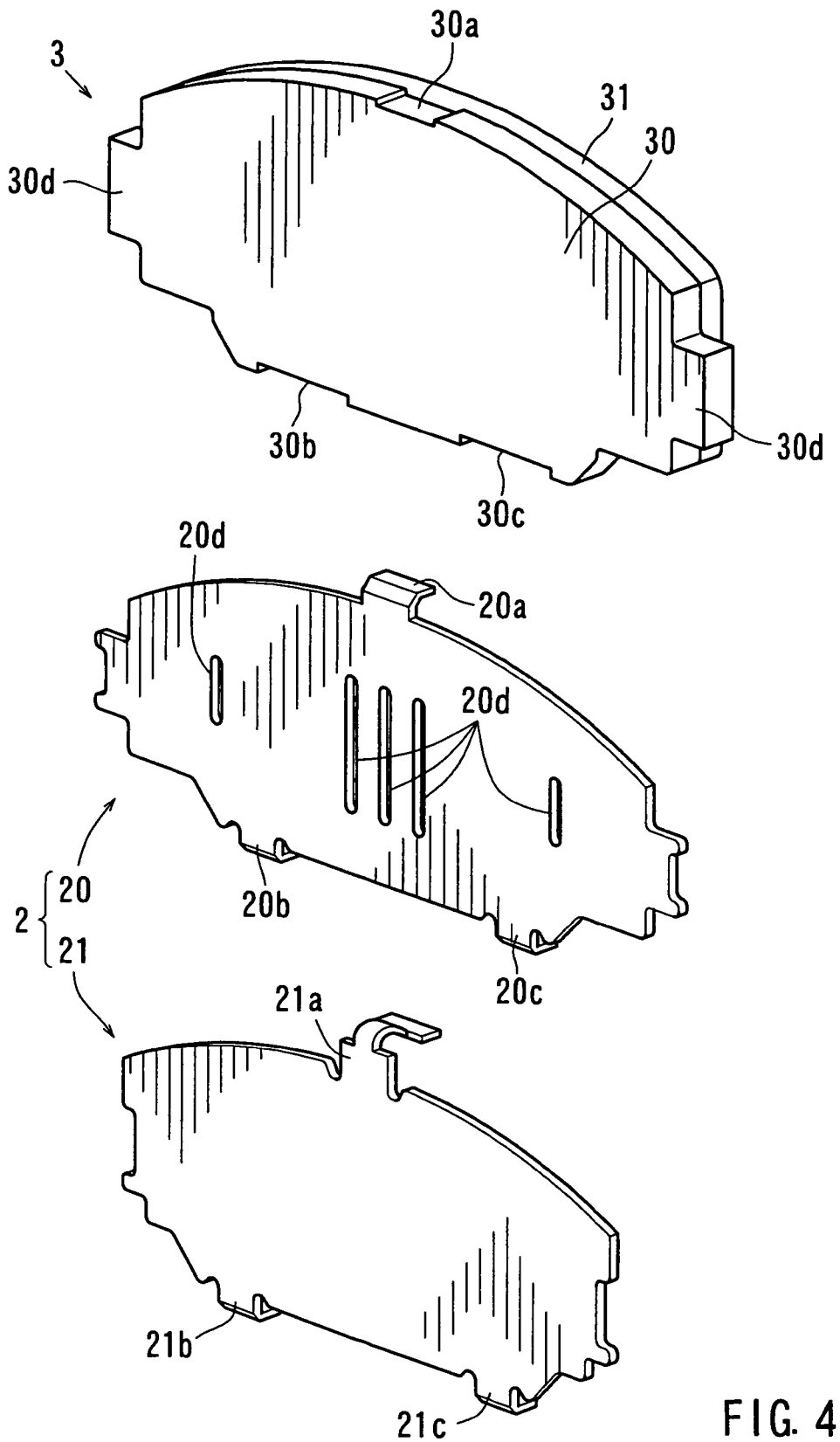
FIG. 4 is a perspective view from a rear side of a composition of the pad unit.

Each pad 3 has a friction member 31 and a backing plate 30 for supporting the back of the friction member 31. The friction member 31 slidably contacts the rotor R, thereby producing a frictional force. The backing plate 30 may be formed from a metal or resin material for example. As shown in FIG. 4, the backing plate 30 has an ear 30d protruding along the circumferential direction of the rotor from each of the end edges along the circumferential direction of the rotor. Each of the ears 30d is movably attached to a guide portion (not shown) recessed into the mounting 11. Therefore, the backing plate 30 is movably supported on the mounting 11 in the rotor rotational axis direction.

As shown in FIG. 2, in order to suppress undesired brake sounds generated between a pressing member (i.e., a piston 12 or the claws 13a and 13b), used for pressing a pad 3 against the rotor R, a laminated shim 2 is disposed between the pressing member (i.e., the piston 12 or the claws 13a and 13b) and the pad 3.

The laminated shim 2 includes a pad side shim 20, provided on the pad 3 side, and a pressing member side shim 21, provided of the side of a pressing member 12, 13a, or 13b, in a laminated manner. Both the pad side shim 20 and the pressing member side shim 21 may be formed from a metal plate, such as stainless steel plate for example. Therefore, the frictional resistance between the pad side shim 20 and the pressing member side shim 21 is configured to be smaller than the frictional resistance between the pad side shim 20 and the backing plate 30.

The pad side shim 20 is provided on the backside of the backing plate 30 as shown in FIG. 2, and covers substantially the entire back of the backing plate 30. As shown in FIG. 4, one outer edge pad hook 20a and several (for example, two) inner edge pad hooks 20b and 20c are formed on the pad side shim 20.

Figure 5:
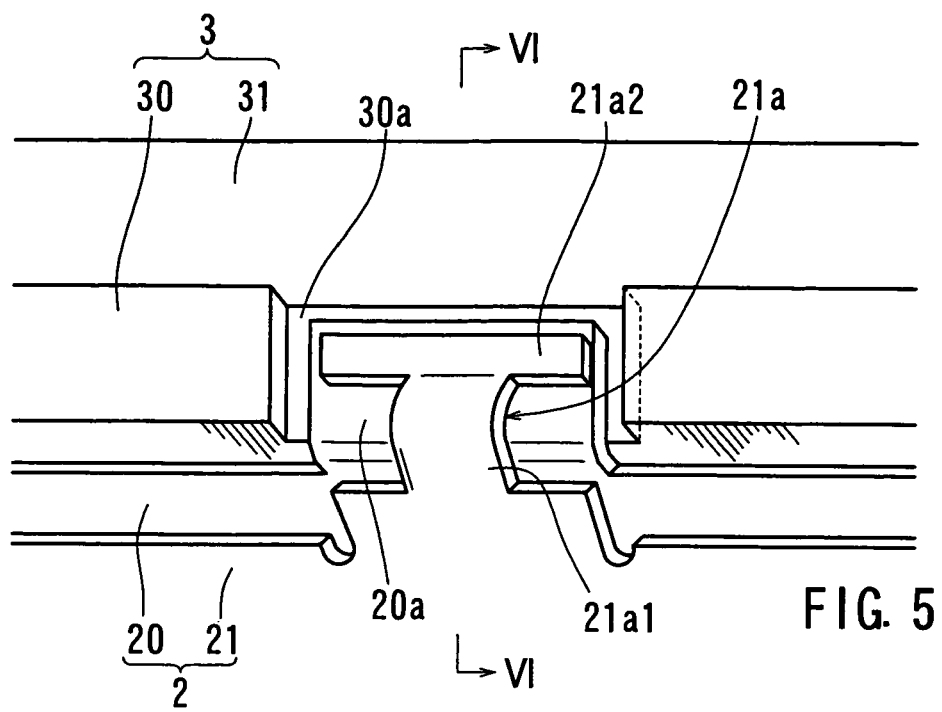
FIG. 5 is an expanded perspective view near an outer edge pressing member hook of a pressing member side shim.

The outer edge pad hook 20a is provided at approximately the center of the outer peripheral edge of the pad side shim 20 (with respect to the circumferential direction) as shown in FIG. 4, and extends over the outer peripheral edge of the backing plate 30, or in other words, the outer peripheral edge of the backing plate 30 extending along the outer circumferential edge of the rotor. The outer edge pad hook 20a is configured to attach onto a recess 30a formed in the outer peripheral edge of the backing plate 30, as shown in FIG. 5.

Figure 3:
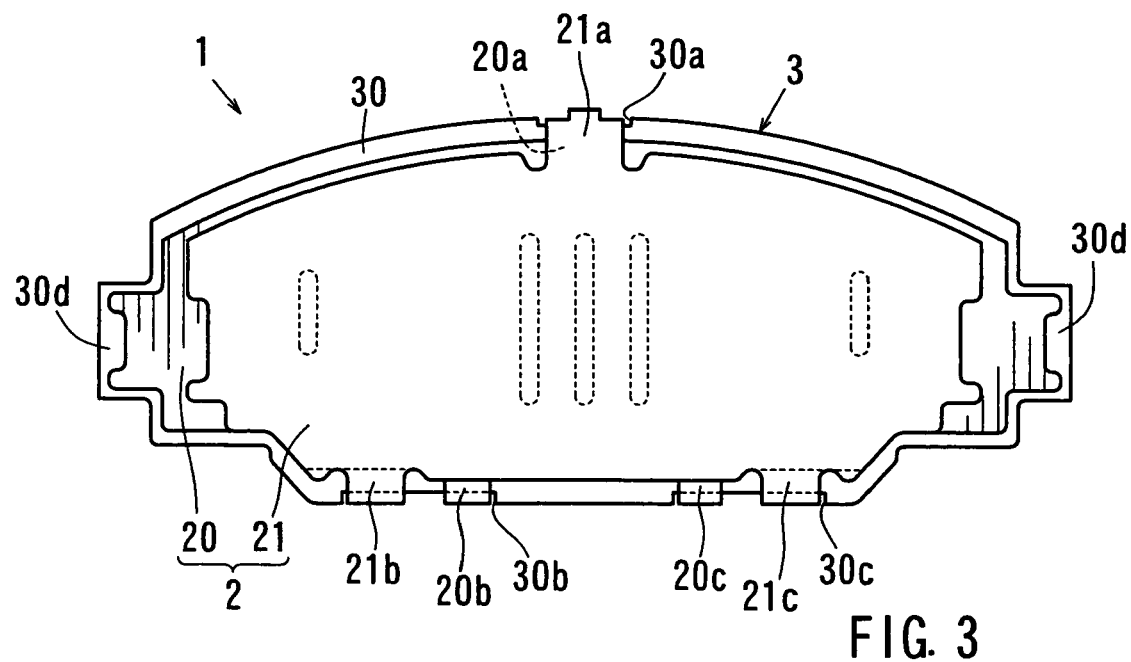
FIG. 3 is a rear view of a pad unit.

The inner edge pad hooks 20b and 20c are arranged in parallel on the inner peripheral edge of the pad side shim 20. The inner edge pad hooks 20b and 20c extend over the inner peripheral edge of the backing plate 30, or in other words, the inner peripheral edge of the backing plate 30 extending along an inner circumference of the rotor near the center of the rotor. The hooks 20b and 20c are configured to respectively attach to the recesses 30b and 30c formed on the inner peripheral edge of the backing plate 30, as shown in FIG. 3.

As shown in FIG. 4, the configuration of the pad side shim 20 includes several slits 20d. Grease is retained in the slits 20d. The grease retained in the slits 20d reduces the frictional resistance between the pad side shim 20 and the backing plate 30 and the frictional resistance between the pad side shim 20 and the pressing member side shim 21. In this way, the grease in this configuration helps to suppress the generation of undesired sounds while braking.

As shown in FIG. 2, the pressing member side shim 21 is disposed between the pad side shim 20 and the claws 13a (13b) or between the pad side shim 20 and the piston 12. As shown in FIG. 4, one outer edge pressing member hook 21a and several (for example, two in this embodiment) inner edge pressing member hooks 21b and 21c are formed on the pressing member side shim 21.

The outer edge pressing member hook 21a is provided at approximately the center of the outer peripheral edge (with respect to the circumferential direction) of the pressing member side shim 21. As shown in FIG. 5, the outer edge pressing member hook 21a extends over the outer peripheral edge of the pressing member side shim 21 to the top (i.e., external) surface of the outer edge pad hook 20a of the pad side shim 20. Thus, the outer edge pressing member hook 21a extends over the outer peripheral edge of the backing plate 30, opposite a surface of the outer edge pad hook 20a. The outer edge pad hook 20a contacts the outer peripheral edge of the backing plate 30. The outer edge pressing member hook 21a is configured to slidably contact the top surface of the outer edge pad hook 20a.

Figure 6:
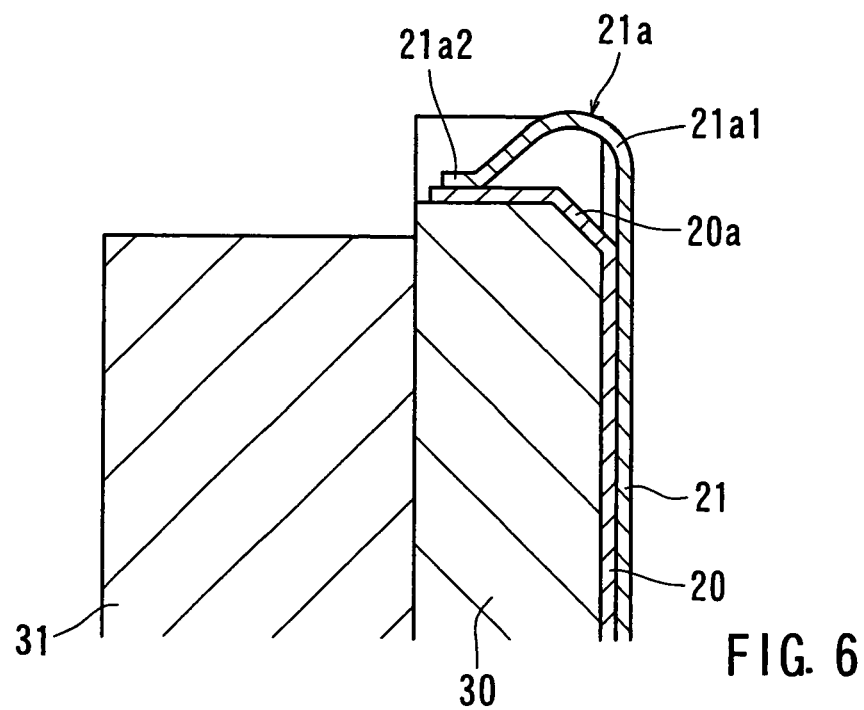
FIG. 6 is a sectional view along the arrowed line VI-VI of FIG. 5.

As shown in FIG. 5, the outer edge pressing member hook 21a has a T-shape portion comprised of a neck portion 21a1 and a contact portion 21a2. The neck portion 21a1 extends over the outer peripheral edge of the pressing member side shim 21 to the top surface of the outer edge pad hook 20a of the pad side shim 20. As shown in FIG. 6, the neck portion 21a1 extends in a curved manner above the top surface of the outer edge pad hook 20a of the pad side shim 20 (i.e., radially outward of the rotor).

The contact portion 21a2 is provided at an end of the neck portion 21a1 and slidably contacts the top surface of the outer edge pad hook 20a of the pad side shim 20. Therefore, the contact portion 21a2 slides along a circumferential direction of the rotor with respect to the top surface of the outer edge pad hook 20a. The contact portion 21a2 has a larger lateral size than the lateral size of the neck portion 21a1. The contact portion 21a2 extends along circumferential direction of the rotor. Therefore, the contact portion 21a2 stably slides along the circumferential direction of the rotor with respect to the top surface of the outer edge pad hook 20a.

The inner edge pressing member hooks 21b and 21c are arranged in parallel on the inner peripheral edge of the pressing member side shim 21. The inner edge pressing member hooks 21b and 21c extend over the inner peripheral edge of the backing plate 30, or in other words, the inner peripheral edge of the backing plate 30 extending along a circumference of the rotor near the center of the rotor. As shown in FIG. 3, the inner edge pressing member hooks 21b and 21c are configured to directly hook on to corresponding recesses 30b and 30c formed on the inner peripheral edge of the backing plate 30.

The laminated shim 2 is formed in the way previously described. Thus, the outer edge pressing member hook 21a is formed on the pressing member side shim 21 and extends over the peripheral edge of the backing plate 30, opposite to the surface of the outer edge pad hook 20a of the pad side shim 20. The outer edge pad hook 20a directly contacts the peripheral edge of the backing plate 30. The outer edge pressing member hook 21a slidably contacts the top surface of the outer edge pad hook 20a.

The outer edge pressing member hook 21a contacts the top surface of the outer edge pad hook 20a of the pad side shim 20. The pressing member side shim 21 is thereby attached to the backing plate 30. The outer edge pressing member hook 21a of the pressing member side shim 21 slidably contacts the top surface of the outer edge pad hook 20a of the pad side shim 20. Therefore, the outer edge pressing member hook 21a more easily slides in a surface direction with respect to the backing plate 30 as compared with a conventional configuration where the outer edge pressing member hook 21a is directly attached to the backing plate 30. Also, since the outer edge pad hook 20a of the pad side shim 20 is formed from a metal plate, such as stainless steel plate for example, the outer edge pad hook 20a has a smaller frictional resistance as compared with the backing plate 30.

In this way, the pressing member side shim 21 easily slides in a surface direction along with the piston 12 or the claws 13a and 13b (see FIG. 2), with respect to the pad side shim 20 and the backing plate 30. Therefore, the pressing member side shim 21 can effectively suppress undesired sounds generated when the piston 12 or the claws 13a and 13b is/are displaced in a surface direction relative to and against the pad 3.

One outer edge pressing member hook 21a is formed on the pressing member side shim 21 as shown in FIG. 3. The outer edge pressing member hook 21a slidably contacts the top surface of the outer edge pad hook 20a of the pad side shim 20. Thus, all of the outer edge pressing member hooks 21a formed on the outer edge of the pressing member side shim 21 slidably contact the top surface of the outer edge pad hook 20a of the pad side shim 20. Therefore, the entire outer edge of the pressing member side shim 21 easily slides along the circumferential direction of the rotor with respect to the backing plate 30.

The outer edge pressing member hook 21a of the pressing member side shim 21 has a neck portion 21a1 and a contact portion 21a2 as shown in FIG. 5. The lateral size of the neck portion 21a1 is smaller than the lateral size of the contact portion 21a2. Therefore, when the pressing member side shim 21 is applied with a force in a surface direction the neck portion 21a1 is more likely to be subjected to stress concentration and undergo elastic deformation as compared with other portions. As a result, the pressing member side shim 21 can be displaced in a surface direction due to the elastic deformation of the neck portion 21a1.

Since the contact portion 21a2 slidably contacts the top surface of the outer edge pad hook 20a of the pad side shim 20, the contact portion 21a2 can slide in the surface direction with respect to the pad side shim 20 and the backing plate 30. In this way, the pressing member side shim 21 can move in a surface direction with respect to the pad side shim 20 and the backing plate 30, due at least in part to the elastic deformation of the neck portion 21a1 and the sliding of the contact portion 21a2.

As shown in FIG. 6, the neck portion 21a1 extends in the curved manner above the top surface of the outer edge pad hook 20a of the pad side shim 20. Since the neck portion 21a1 extends in a curved manner, the neck portion 21a1 may have a larger length in the extending direction as compared with a case in which a neck portion is not extended in a curved manner. Consequently, the elastic deformation ability of the neck portion 21a1 is increased and the moving distance of the pressing member side shim 21 in a surface direction is also increased with respect to the pad side shim 20 and the backing plate 30.

As shown in FIG. 5, the recess 30a, on which the outer edge pad hook 20a of the pad side shim 20 is attached, is formed on the outer peripheral edge of the backing plate 30. The outer edge pad hook 20a of the pad side shim 20 and the outer edge pressing member hook 21a of the pressing member side shim 21 are internally arranged within the recess 30a. The recess 30a is configured so that the component wall faces of the recess 30a restrict the sliding level of the outer edge pressing member hook 21a of the pressing member side shim 21. The outer edge pressing member hook 21a of the pressing member side shim 21 slides along the circumferential direction of the rotor on the top surface of the outer edge pad hook 20a of the pad side shim 20. The component wall faces of the recess 30a of the backing plate 30 restrict the sliding distances of the hook 21a.

(Possible Alternative Arrangements of the Above Embodiment)

(1) Although the inner edge pressing member hook of the pressing member side shim in the above representative embodiment was directly attached to the backing plate, the inner edge pressing member hook can be configured to contact the top surface of the inner edge pad hook of the pad side shim. According to this type of configuration, the inner edge side of the pressing member side shim will also easily slide along the circumferential direction of the rotor with respect to the pad side shim and the backing plate. In a preferable configuration, all of the inner edge pressing member hooks of the pressing member side shim contact the top surfaces of respective inner edge pad hooks of the pad side shim.

(2) In (1), the outer edge pressing member hooks of the pressing member side shim may be configured to directly attach to the backing plate.

(3) The disc brake according to the above representative embodiment was a floating disc brake, configured to have caliper claws and a piston as the pressing member. However, the disc brake may be an opposed type of disc brake, having have two opposing pistons as the pressing members.

This invention claims:

1. A laminated shim for a disc brake comprising:
a pad side shim provided at a backside of a backing plate of a pad;
a pressing member side shim disposed between the pad side shim and a pressing member used to press the pad against a rotor;
wherein one or more pad hooks are formed on the pad side shim and extend over a peripheral edge of the backing plate;
wherein the one or more pad hooks are attached to the peripheral edge of the backing plate;
one or more corresponding pressing member hooks are formed on the pressing member side shim and at least one of the corresponding pressing member hooks extends over a corresponding top surface of at least one of the one or more pad hooks;
wherein at least one of the one or more pressing member hooks slidably contacts the corresponding at least one of the one or more pad hooks;

wherein the peripheral edge of the backing plate comprises an outer peripheral edge and an inner peripheral edge located radially inward of the outer peripheral edge;

wherein the one or more pad hooks comprise one or more outer edge pad hooks and one or more inner edge pad hooks;

wherein the one or more pressing member hooks comprise one or more outer edge pressing member hooks and one or more inner edge pressing member hooks;

wherein the one or more outer edge pad hooks extend over and attach to the outer peripheral edge of the backing plate;

wherein the one or more inner edge pad hooks extend over and attach to the inner peripheral edge of the backing plate;

wherein each of the one or more outer edge pressing member hooks extends over a corresponding one of the one or more outer edge pad hooks;

wherein each of the one or more inner edge pressing member hooks extends over the inner peripheral edge of the backing plate;

wherein all of the one or more outer edge pressing member hooks of the pressing member side shim extend over a surface of the corresponding one of the one or more outer edge pad hooks; and wherein each of the one or more outer edge pressing member hooks slidably contacts the surface of the corresponding one of the one or more outer edge pad hooks.

2. A pad unit for a disc brake having the laminated shim for the disc brake of claim 1 and a pad, wherein the peripheral edge of the backing plate of the pad comprises one or more recesses;

wherein the one or more pad hooks and the one or more pressing member hooks are respectively contained within the one or more recesses; and wherein a sliding distance of the at least one of the one or more pressing member hooks is restricted by a composition wall faces of the corresponding one or more recesses.

3. The laminated shim for the disc brake as in claim 1, wherein at least one of the outer edge pressing member hooks of the pressing member side shim, slidably contacting the corresponding one of the one or more outer edge pad hooks, comprises:

a neck portion extending over a portion of the surface of the corresponding one of the one or more outer edge pad hooks;

a contact portion provided at an end of the neck portion and slidably contacted to the surface of corresponding one of the one or more outer edge pad hooks; and wherein a lateral size of each of the neck portions is less than a lateral size of each of the contact portions.

4. The laminated shim for the disc brake of claim 3, wherein the neck portion of the at least one of the one or more outer edge pressing member hooks extends in a curved manner above the surface of the corresponding one of the one or more outer edge pad hooks.

5. A laminated shim for a disc brake comprising:

a pad side shim provided at a backside of a backing plate of a brake pad;

a pressing member side shim disposed between the pad side shim and a pressing member used to press the brake pad against a rotor;

wherein one or more pad hooks are formed on the pad side shim and extend over a peripheral edge of the backing plate;

wherein one or more recesses are formed in the peripheral edge of the backing plate corresponding to the one or more pad hooks:

wherein the one or more pad hooks are attached to the corresponding one or more recesses formed in the peripheral edge of the backing plate;

one or more corresponding pressing member hooks are formed on the pressing member side shim and at least one of the corresponding pressing member hooks extends over a corresponding top surface of at least one of the one or more pad hooks;

wherein the at least one of the one or more pressing member hooks slidably contacts the corresponding surface of at least one of the one or more pad hooks;

wherein the peripheral edge of the backing plate comprises an outer peripheral edge and an inner peripheral edge located radially inward of the outer peripheral edge; and wherein the at least one of the one or more pressing member hooks slidably contacts the corresponding surface of at least one of the one or more pad hooks attached to the inner peripheral edge of the backing plate.

6. The laminated shim for a disc brake described in claim 5, wherein the at least one of the one or more pressing member hooks slidably contacts the corresponding surface of at least one of the one or more pad hooks attached to the outer peripheral edge of the backing plate.

7. A laminated shim for a disc brake comprising:

a pad side shim provided at a backside of a backing plate of a brake pad;

a pressing member side shim disposed between the pad side shim and a pressing member used to press the brake pad against a rotor;

wherein one or more pad hooks are formed on the pad side shim and extend over a peripheral edge of the backing plate;

wherein one or more recesses are formed in the peripheral edge of the backing plate corresponding to the one or more pad hooks;

wherein the one or more pad hooks are attached to the corresponding one or more recesses formed in the peripheral edge of the backing plate;

one or more corresponding pressing member hooks are formed on the pressing member side shim and at least one of the corresponding pressing member hooks extends over a corresponding top surface of at least one of the one or more pad hooks;

wherein the at least one of the one or more pressing member hooks slidably contacts the corresponding surface of at least one of the one or more pad hooks;

wherein the peripheral edge of the backing plate comprises an outer peripheral edge and an inner peripheral edge located radially inward of the outer peripheral edge;

wherein all of the one of the one or more pressing member hooks slidably contact the corresponding surfaces of all of the one or more pad hooks;

wherein the at least one of the one or more pressing member hooks slidably contacts the corresponding surface of at least one of the one or more pad hooks attached to the outer peripheral edge of the backing plate; and wherein another one of the one or more pressing member hooks slidably contacts the corresponding surface of another one of the one or more pad hooks attached to the inner peripheral edge of the backing plate.

* * * * *